(12) United States Patent
Lambert (10) Patent No.: US 10,090,959 B2
(45) Date of Patent: Oct. 2, 2018

(54) FREE SPACE OPTICAL COMMUNICATIONS NETWORK WITH MULTIPLEXED BENT PIPE CHANNELS

(71) Applicant: The Boeing Company, Chicago, IL (US)

(72) Inventor: Stephen G. Lambert, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/792,592

(22) Filed: Jul. 6, 2015

(65) Prior Publication Data

US 2017/0012730 A1    Jan. 12, 2017

(51) Int. Cl.
```
H04J 14/02   (2006.01)
H04B 10/112  (2013.01)
H04B 10/118  (2013.01)
H04Q 11/00   (2006.01)
H04B 10/29   (2013.01)
```
(52) U.S. Cl.
CPC ......... *H04J 14/021* (2013.01); *H04B 10/118* (2013.01); *H04B 10/1129* (2013.01); *H04B 10/29* (2013.01); *H04J 14/02* (2013.01); *H04Q 11/0005* (2013.01); *H04Q 2011/0016* (2013.01)

(58) Field of Classification Search
CPC ..... H04J 14/021; H04B 10/29; H04B 10/1129
USPC .......................................................... 398/83
See application file for complete search history.

(56) References Cited

U.S. PATENT DOCUMENTS

| | | | |
|---|---|---|---|
| 5,710,652 A * | 1/1998 | Bloom | H04B 10/118 398/129 |
| 5,918,157 A | 6/1999 | Wiedeman et al. | |
| 6,545,787 B1 * | 4/2003 | Lenormand | H04B 7/18521 398/121 |
| 6,912,075 B1 * | 6/2005 | Ionov | H04B 10/118 398/121 |
| 7,292,789 B1 * | 11/2007 | Capots | H04B 10/1121 398/121 |
| 2002/0101632 A1 | 8/2002 | Meckler | |
| 2002/0187809 A1 | 12/2002 | Mani et al. | |
| 2007/0230961 A1 * | 10/2007 | Nagata | H04J 14/0212 398/82 |
| 2014/0016932 A1 | 1/2014 | Coleman et al. | |
| 2014/0016941 A1 | 1/2014 | Coleman et al. | |
| 2014/0294399 A1 * | 10/2014 | Makowski | H04B 10/11 398/126 |
| 2016/0006536 A1 * | 1/2016 | Rhy | H04J 14/0213 398/83 |

FOREIGN PATENT DOCUMENTS

DE    102013206064 A1    10/2014

OTHER PUBLICATIONS

Search Report for related European Application No. EP16177800.6; report dated Nov. 14, 2016.

* cited by examiner

*Primary Examiner* — Juan A Torres
(74) *Attorney, Agent, or Firm* — Miller, Matthias & Hull LLP (57) ABSTRACT

A free space optical communications network comprises a constellation of relay nodes in serial optical communication to form an optical path. The relay nodes are configured to wavelength-multiplex a plurality of wavelength-dependent optical bent pipe channels into and out of the optical path.

20 Claims, 6 Drawing Sheets

FREE SPACE OPTICAL COMMUNICATIONS NETWORK WITH MULTIPLEXED BENT PIPE CHANNELS

BACKGROUND

In a free space optical (FSO) communications network having a bent pipe architecture, data is transferred between relay nodes via optical space links. At each relay node, the data is re-amplified, but not modulated or demodulated.

Conventionally, a network may include a first relay node, a near neighbor relay node, and a next near neighbor relay node. A first bent pipe channel from the first relay node to the near neighbor node is established by a first crosslink, and a second bent pipe channel from the first node to the next near neighbor node is established by a second crosslink.

SUMMARY

According to an embodiment herein, a free space optical communications network comprises a constellation of relay nodes in serial optical communication to form an optical path. The relay nodes are configured to wavelength-multiplex a plurality of wavelength-dependent optical bent pipe channels into and out of the optical path.

According to another embodiment herein, a node for a free space optical communications relay network comprises first and second optical apertures, and optical circuitry for providing an optical path between the first and second apertures. The optical circuitry includes an optical add-drop multiplexer for adding uplinked bent pipe channels having specific wavelengths to the optical path, and dropping bent pipe channels having specific wavelengths from the optical path.

According to another embodiment herein, a method for a relay node in a free space optical communications relay network comprises forming an optical path between near neighbors. The optical path includes a plurality of wavelength-dependent optical bent pipe channels that are wavelength-multiplexed. Bent pipe channels of a first subset of the bent pipe channels are dropped from the optical path according to wavelength and downlinked. A second subset of the bent pipe channels having different wavelengths is received via uplink and added to the optical path.

These features and functions may be achieved independently in various embodiments or may be combined in other embodiments. Further details of the embodiments can be seen with reference to the following description and drawings.

DETAILED DESCRIPTION

Figure 1:
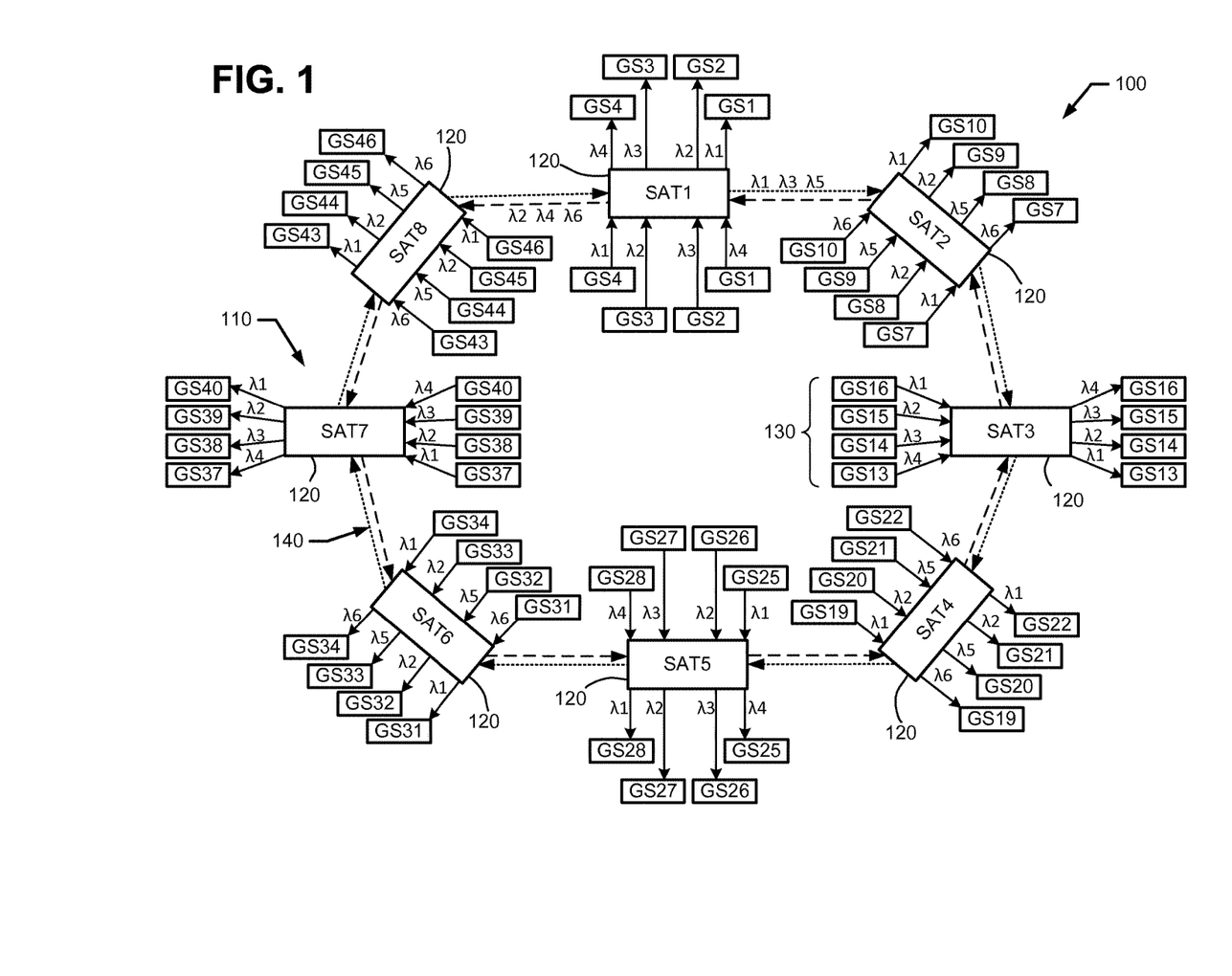
FIG. 1 is an illustration of a free space optical communications network including a constellation of relay nodes in serial optical communication.

Reference is made to FIG. 1, which illustrates a free space optical communications network 100. The network 100 includes a constellation 110 of relay nodes 120. The relay nodes 120 preferably include satellites, but are not so limited. For instance, the relay nodes 120 may include high altitude aircraft, or balloons, or satellites, or any combination thereof.

Relay nodes 120 such as satellites are not limited to a particular orbit. For instance, the satellites may be at lower earth orbit (LEO). However, high altitudes typically result in longer contact times and less configuration. Satellites at geosynchronous earth orbit (GEO) typically have the longest contact times and least reconfiguration.

The relay nodes 120 in the constellation 110 are not limited to any particular number, but should be greater than two in order to realize the advantages described below.

Each relay node 120 communicates with one or more users 130. A user refers to any entity that uplinks and/or downlinks to the constellation 110. Examples of users include, but are not limited to, ground stations, airborne platforms, sea-based platforms, and space-based platforms (e.g., a satellites outside of the constellation 110).

For each relay node 120, its users 130 uplink at different wavelengths, and they downlink at different wavelengths. The wavelengths are separated. The network 100 may use wavelengths from the International Telecommunications Union (ITU) grid.

Different users 130 may be at different geographic locations, or multiple users 130 may be at nearly the same geographic location. Separation by wavelength enables the users 130 to be almost co-located geographically.

Although FIG. 1 illustrates four users 130 per relay node 120, the number of users 130 is not limited to four. The actual number of users 130 per relay node 120 depends on available spectrum and wavelength spacing.

The relay nodes 120 in the constellation 110 are in serial optical communication to form an optical path 140. The optical path 140 includes optical links between the relay nodes 120. Each optical link between two relay nodes 120 may be established via laser communications (lasercom).

Each relay node 120 in the constellation 110 has at least one near neighbor and one next near neighbor. Each relay node 120 is crosslinked to its near neighbor(s) but not its next near neighbor(s).

FIG. 1 illustrates the relay nodes 120 in serial optical communication to form a ring structure. In the ring structure, each relay node 120 has two near neighbors and two next near neighbors, but is only crosslinked to the two near neighbors.

However, the network 100 is not limited to a ring structure. For instance, the relay nodes 120 may be in serial optical communication to form a line network. In a line network, not all relay nodes 120 have two near neighbors and two next near neighbors. For instance, each end node only has a single near neighbor and a single next near neighbor. Moreover, the end nodes of a line network are not crosslinked.

The relay nodes 120 are configured to wavelength-multiplex a plurality of optical bent pipe channels into and out of the optical path 140. In each bent pipe channel, data is re-amplified but not modulated or demodulated.

The bent pipe channels are wavelength-dependent. Data is uplinked to a relay node 120 at a specific wavelength, and optical transmission along the optical path 140 depends up that wavelength. Depending on its wavelength, a bent pipe channel may be added, dropped, or passed by a relay node 120. Each relay node 120 may use an optical add-drop multiplexer (OADM) to add a bent pipe channel to the optical path 140, drop a bent pipe channel from the optical path 140, and pass a bent pipe channel along the optical path 140. The OADM is configured to add, drop or pass the bent pipe channel according to the wavelength of the bent pipe channel.

The OADM is a passive device. In the alternative, an active device may be used.

The number of multiplexed bent pipe channels in the optical path 140 may be constant. For example, if a relay node 120 drops a bent pipe channel from the optical path 140, it also adds a bent pipe channel to the optical path 140.

In some configurations, a relay node 120 may add a number of bent pipe channels without dropping the same number. However, increasing the number of bent pipe channels in the optical path 140 would add to the overall terminal needs for higher signal powers and/or larger aperture size.

The optical path 140 may be bidirectional, whereby some of the bent pipe channels carry data in one direction, and other bent pipe channels carry data in an opposite direction. For lasercom, light signals moving in opposite directions may be used for pointing, acquisition and tracking.

The wavelength of the uplink may determine the wavelength of the bent pipe channel. For example, each relay node 120 is configured to receive an uplink at a specific wavelength and add a bent pipe channel at that specific wavelength.

The relay node 120 that adds a specific bent pipe channel to the optical path 140 and the relay node 120 that drops that bent pipe channel are pre-configured. The one relay node 120 is configured to receive data by an uplink at a specific wavelength. The bent pipe channel is added to the optical path 140 at that specific wavelength, the data is sent via the bent pipe channel over a pre-configured number of hops to another relay node 120, and that other relay node 120 is configured to send the data by a downlink.

Consider the example of FIG. 1. In this example, the relay nodes 120 include eight satellites SAT1 to SAT8 in the constellation 110, and the users 130 include four ground stations (GS) per satellite. The optical path 140 includes eight optical links, the optical path 140 is bi-directional, and the number of wavelengths in the optical path 140 is constant at six. Odd wavelengths ($\lambda 1$, $\lambda 3$, $\lambda 5$) travel in one direction (represented by dot lines), and even wavelengths ($\lambda 2$, $\lambda 4$, $\lambda 6$) travel in an opposite direction (represented by dash lines). These wavelengths may be pre-assigned according to a wavelength plan.

Each satellite SAT1 to SAT8 has two near neighbors and two next near neighbors. For instance, satellites SAT2 and SAT8 are the near neighbors of satellite SAT1, and satellites SAT3 and SAT7 are the next near neighbors of satellite SAT1.

Now consider ground station GS2 when it transmits data to satellite SAT1 by an uplink at wavelength $\lambda 3$. Satellite SAT1 includes an OADM that is configured to add the data to the optical path 140, thereby adding a bent pipe channel having wavelength $\lambda 3$. The data is transmitted in a clockwise direction to satellite SAT2, whose OADM is configured to pass the data. The data continues in a clockwise direction to satellite SAT3, which includes an OADM that is configured to drop the bent pipe channel having the wavelength $\lambda 3$. The data from the dropped bent pipe channel is relayed a ground station (GS15) that is configured to downlink at wavelength $\lambda 3$.

Ground stations GS1, GS2, GS3 and GS4 are configured to uplink to satellite SAT1. Ground station GS1 can only send data at wavelength $\lambda 4$ to ground station GS37 via satellites SAT1, SAT8 and SAT7. Ground station GS2 can only send data at wavelength $\lambda 3$ to ground station GS15 via satellites SAT1, SAT2 and SAT3. Ground station GS3 can only send data at wavelength $\lambda 2$ to ground station GS44 via satellites SAT1 and SAT8. Ground station GS4 can only send data at wavelength $\lambda 1$ to ground station GS10 via satellites SAT1 and SAT2.

The bent pipe channels started at ground stations GS3 and GS4 cover a single hop to the near satellite SAT8 and SAT2, respectively. The bent pipe channels started at ground stations GS1 and GS2 each cover two hops to the next near satellite SAT7 and SAT3, respectively.

The network 100 enables each satellite SAT1-SAT8 to transfer data along a single optical path 140 to its near neighbors and next near neighbors without having to establish crosslinks with the next near neighbors. Because the link range from a satellite to its near neighbor is less than the link range from that satellite to its next near neighbor, and because the near neighbor acts as a repeater amplifying the signal traversing to the next near neighbor, the optical aperture size can be reduced from what would be necessary for crosslinking directly to the next near neighbor, thereby reducing payload size, weight and power. For instance, the size, weight and power of SAT1 for crosslinking to satellite SAT2 is reduced from what would be necessary for crosslinking to satellite SAT3.

The other bent pipe channels in the network 100 of FIG. 1 are added and dropped according to the same principles. Now consider ground station GS22, which transmits data to satellite SAT4 by an uplink at wavelength $\lambda 6$. Satellite SAT4 includes an OADM that is configured to add a bent pipe channel having wavelength $\lambda 6$ to the optical path 140. The bent pipe channel travels in a counterclockwise direction to satellite SAT3, whose OADM is configured to pass the bent pipe channel to satellite SAT2. The OADM of satellite SAT2 is configured to drop the bent pipe channel having the wavelength $\lambda 6$ and transmit the dropped bent pipe channel to a ground station configured for a downlink at wavelength $\lambda 6$ (GS7).

Table 1 summarizes the bent pipe channels for the network 100 of FIG. 1. Each row in Table 1 represents a bent pipe channel. The source and destination refer to the ground stations at which a bent pipe channel begins and ends.

TABLE 1

| Source | Dest | Freq. | # of hops |
|--------|------|-------|-----------|
| GS1    | GS37 | $\lambda 4$ | 2 |
| GS2    | GS15 | $\lambda 3$ | 2 |
| GS3    | GS44 | $\lambda 2$ | 1 |
| GS4    | GS10 | $\lambda 1$ | 1 |
| GS7    | GS13 | $\lambda 1$ | 1 |
| GS8    | GS2  | $\lambda 2$ | 1 |
| GS9    | GS20 | $\lambda 5$ | 2 |
| GS10   | GS46 | $\lambda 6$ | 2 |
| GS13   | GS4  | $\lambda 4$ | 2 |
| GS14   | GS26 | $\lambda 3$ | 2 |
| GS15   | GS9  | $\lambda 2$ | 1 |
| GS16   | GS22 | $\lambda 1$ | 1 |
| GS19   | GS28 | $\lambda 1$ | 1 |
| GS20   | GS14 | $\lambda 2$ | 1 |
| GS21   | GS33 | $\lambda 5$ | 2 |
| GS22   | GS7  | $\lambda 6$ | 2 |
| GS25   | GS31 | $\lambda 1$ | 1 |
| GS26   | GS21 | $\lambda 2$ | 1 |
| GS27   | GS38 | $\lambda 3$ | 2 |
| GS28   | GS16 | $\lambda 4$ | 2 |
| GS31   | GS19 | $\lambda 6$ | 2 |
| GS32   | GS45 | $\lambda 5$ | 2 |
| GS33   | GS26 | $\lambda 2$ | 1 |
| GS34   | GS40 | $\lambda 1$ | 1 |
| GS37   | GS43 | $\lambda 1$ | 1 |

TABLE 1-continued

| Source | Dest | Freq. | # of hops |
|---|---|---|---|
| GS38 | GS32 | λ2 | 1 |
| GS39 | GS3 | λ3 | 2 |
| GS40 | GS25 | λ4 | 2 |
| GS43 | GS34 | λ6 | 2 |
| GS44 | GS8 | λ5 | 2 |
| GS45 | GS39 | λ2 | 1 |
| GS46 | GS1 | λ1 | 1 |

The network configuration of FIG. 1 is static. Each bent pipe channel always has the same source and destination.

In this example, six wavelengths are utilized. The optical path 140 always has three bent pipe channels (odd wavelengths) multiplexed in one direction, and another three bent pipe channels (even wavelengths) multiplexed in the opposite direction.

In this example, the bent pipe channels travel one or two hops. In another configuration of the network 100, however, the optical circuitry may be configured so certain bent pipe channels travel more than two hops.

Figure 2:
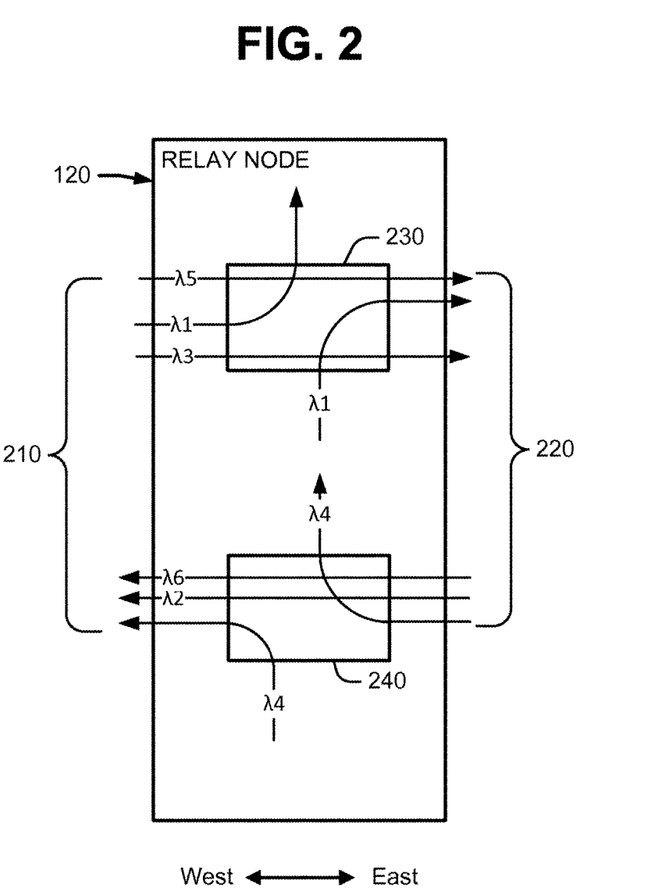
FIG. 2 is an illustration of optical add-drop multiplexing of bent pipe channels in the free space optical communications network.

Reference is now made to FIG. 2, which illustrates optical add-drop multiplexing of bent pipe channels into and out of the optical path. A relay node 120 communicates with its near neighbor to the West (not shown) via a first optical link 210, and it communicates with its near neighbor to the East (not shown) via a second optical link 220. The first relay node 120 includes a first OADM 230, which receives, via the first optical link 210, bent pipe channels having wavelengths λ1, λ3 and λ5. The first OADM 230 is configured to drop the bent pipe channel having wavelength λ1, and add a bent pipe channel having wavelength λ1. The first OADM 230 sends the bent pipe channels having wavelengths λ1, λ3 and λ5 to the second optical link 220. Thus, data flows from West to East.

The first relay node 120 includes a second OADM 240, which receives, via the second optical link 220, bent pipe channels having wavelengths λ2, λ4 and λ6. The second OADM 240 is configured to drop the bent pipe channel having wavelength λ4, and add a bent pipe channel having wavelength λ4. The second OADM 240 sends the bent pipe channels having wavelengths λ2, λ4 and λ6 to the first optical link 210. Thus, data flows from East to West.

Reference is once again made to FIG. 1. In the network of FIG. 1, each source sends data to a destination via a bent pipe channel. Another configuration of the network 100, however, may use backup bent pipe channels. The backup bent pipe channels may be used for data re-routing in the event of a ground station outage.

Figure 3:
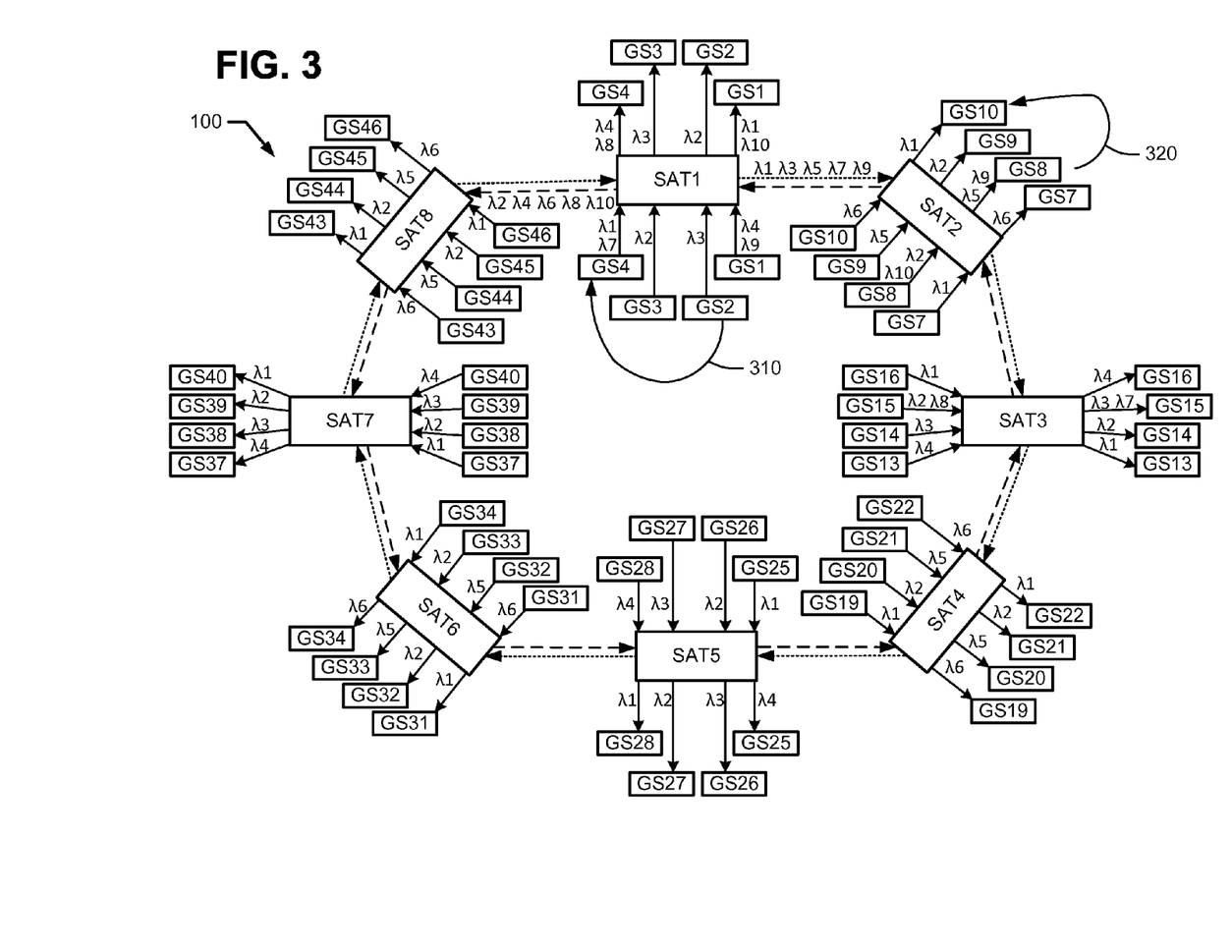
FIG. 3 is an illustration of data re-routing in a free space optical communications network.

Reference is now made to FIG. 3, which illustrates the re-routing of data in a network 100 having backup bent pipe channels. Consider ground station GS2, which is uplinking data to satellite SAT1 at wavelength λ3 (the data will reach ground station GS15 via satellites SAT2 and SAT3). If an outage occurs at ground station GS2, the data at ground station GS2 may be replicated and transferred via terrestrial means 310 to ground station GS4. Ground station GS4 then uplinks the transferred data to satellite SAT1 at wavelength λ7. Satellite SAT2 is configured to transfer the data to satellite SAT3, which is configured to drop the bent pipe channel having wavelength λ7 and send the dropped bent pipe channel to ground station GS15. Once this backup bent pipe channel with ground station GS15 has been established, the bent pipe channel between ground stations GS2 and GS15 may be terminated.

Now consider ground station GS1, which is sending data to ground station GS10 via a bent pipe channel having wavelength λ4. If ground station GS10 is about to incur an outage, the data at ground station GS10 may be replicated and additionally uplinked to satellite SAT1 at wavelength λ9. Satellites SAT1 and SAT2 are configured to form a backup bent pipe channel with ground station GS8. Once the outage occurs at ground station GS10, data is transferred via terrestrial means 320 from ground station GS8 to ground station GS10.

Figure 4A:
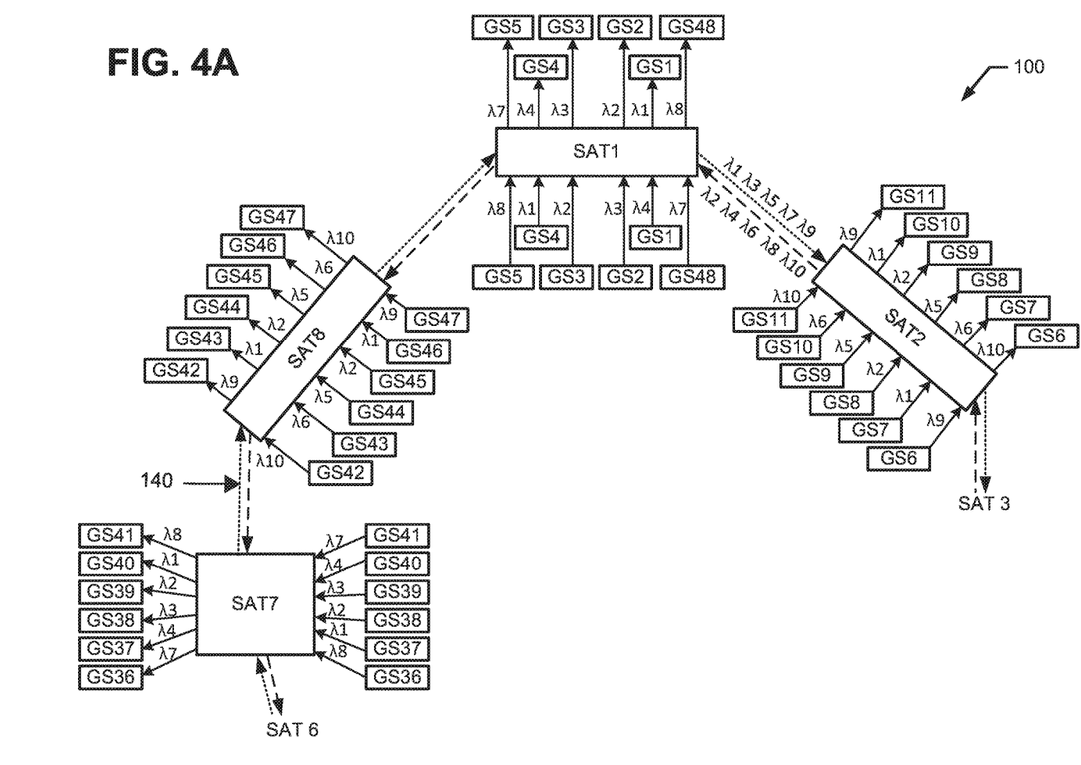
FIGS. 4A and 4B illustrate a free space optical communications network having a higher number of users per relay node than the network of FIG. 1.
Figure 4B:
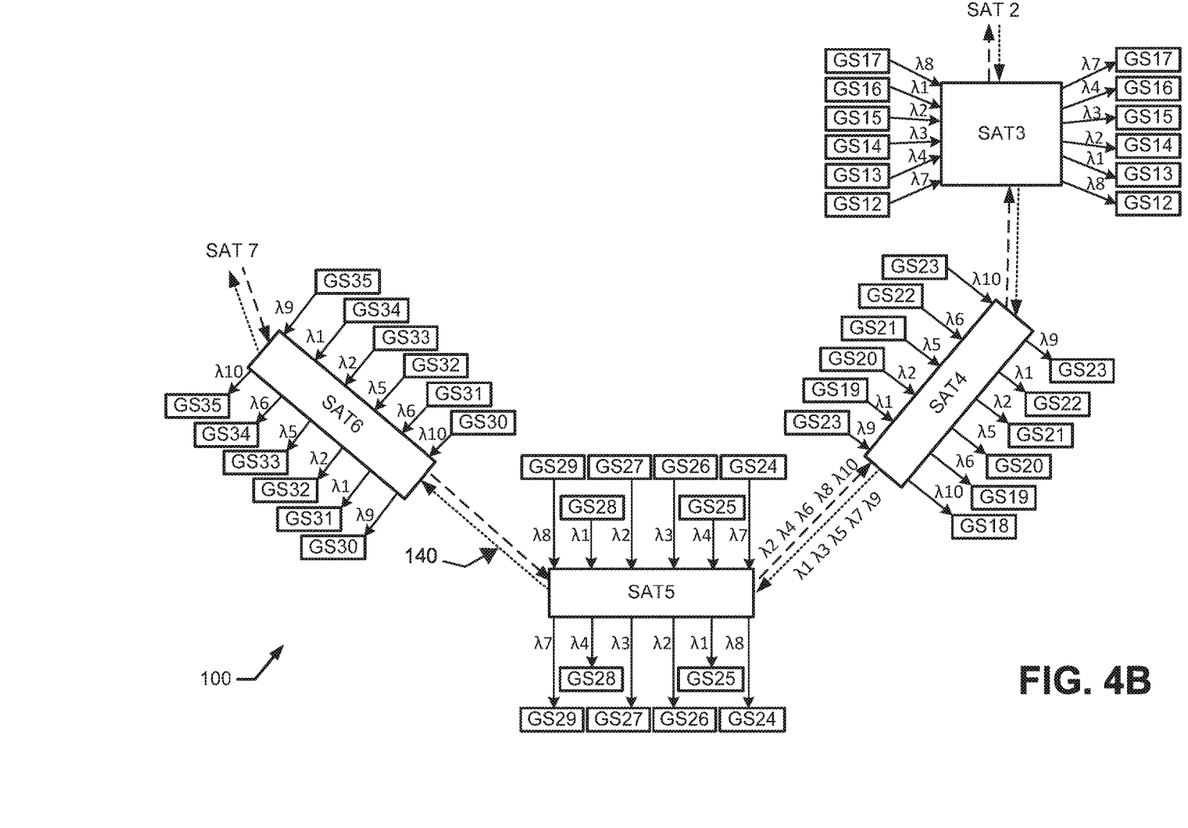

The number of users per relay node 120 is not limited to four. FIGS. 4A and 4B illustrate examples in which six users are assigned to each relay node 120, thus giving the network of FIGS. 4A and 4B higher capacity than the network of FIG. 1.

Reference is now made to FIGS. 4A and 4B, which illustrates a network 100 configured for six users per satellite SAT1-SAT8. The network 100 of FIGS. 4A and 4B utilizes a total of ten wavelengths. The even-numbered wavelengths (λ2, λ4, λ6, λ8 and λ10) are sent in a first direction along the optical path 140, and the odd-numbered wavelengths (λ1, λ3, λ5, λ7 and λ9) are sent in a second, opposite direction along the optical path 140.

Figure 5:
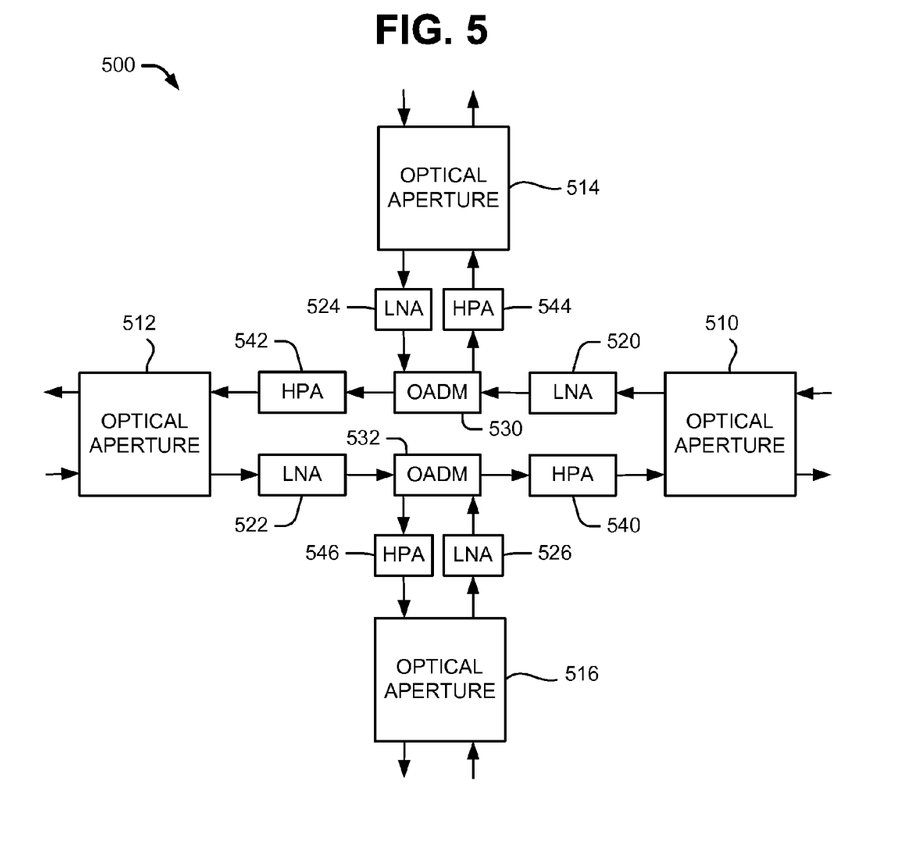
FIG. 5 is an illustration a relay node for a free space optical communications network.

Reference is now made to FIG. 5, which illustrates an optical payload 500 of a relay node 120 such as a satellite. The payload 500 includes first and second gimbaled optical apertures 510 and 512 (e.g., a gimbaled telescope and optics). Each optical aperture 510 and 512 maintains an optical link with a near satellite.

Optical circuitry between the first and second optical apertures 510 and 512 sends bent pipe channels in opposite first and second directions. In the first direction, an optical link received by the first optical aperture 510 is amplified by a first low noise amplifier (LNA) 520 and sent to a first OADM 530. An output of the first OADM 530, which includes multiplexed bent pipe channels, is amplified by a high power amplifier (HPA) 542 and transmitted by the second optical aperture 512. In the second direction, an optical link received by the second optical aperture 512 is amplified by a second LNA 522 and sent to a second OADM 532. An output of the second OADM 532 is amplified by a second HPA 540 and transmitted by the first optical aperture 510. Standard LNAs 520 and 522 and HPAs 540 and 542 may be used, except that they are configured for a broader spectrum than single wavelength amplifiers. The spectrum may be broadened by widening optical filter bandwidths or providing a comb filter matching the ITU grid channel spacing.

The payload 500 further includes a third optical aperture 514 for uplinking signals to the first OADM 530 and downlinking signals dropped by the first OADM 530; and a fourth optical aperture 516 for uplinking signals to the second OADM 532 and downlinking signals dropped by the second OADM 532. Each bent pipe channel uplinked to the third optical aperture 514 may be amplified by a third LNA 524, and each bent pipe channel dropped by the first OADM 530 may be amplified by a third HPA 544 prior to being downlinked. Similarly, each bent pipe channel uplinked to the fourth optical aperture 516 may be amplified by a fourth LNA 526, and each bent pipe channel dropped by the second OADM 532 may be amplified by a fourth HPA 546 prior to being downlinked.

In the payload 500, no optical to electrical-to-optical conversion is performed. Without electrical-to-optical conversion, the payload 500 reduces hardware parts count, size, weight, power, and cost.

The payload 500 has fewer optical terminals than a conventional payload that is crosslinked to its near neighbors and next near neighbors. Whereas a conventional payload includes four optical apertures for crosslinking to its near and next near neighbor, the payload 500 only has two optical apertures 510 and 512 and associated optical circuitry for cross linking to its next near neighbors. Optical apertures for crosslinking to next near neighbors are typically larger than the optical apertures 510 and 512 for crosslinking to the near neighbors. As a result, the payload 500 is smaller, lighter, and less expensive than a conventional payload.

The invention claimed is:

1. A free space optical communications network comprising:
    a constellation of relay nodes in serial optical communication to form an optical path,
    and a plurality of optical bent pipe channels configured to re-amplify data,
    wherein the relay nodes are configured to wavelength-multiplex the plurality of optical bent pipe channels of the same wavelength into and out of the optical path,
    wherein each relay node includes a pair of optical multiplexers, each multiplexer is configured to crosslink data between nearest neighboring relay nodes via a first and second optical aperture within the optical path and to crosslink data between next nearest neighboring relay nodes via a third optical aperture configured to uplink and downlink the same wavelength with a ground station.

2. The network of claim 1, wherein each one of the relay nodes communicates with a next near neighbor without a crosslink to the next near neighbor.

3. The network of claim 1, wherein the relay nodes are serially connected to form a ring structure.

4. The network of claim 1, wherein data that is transferred on each bent pipe channel is re-amplified but not modulated or demodulated.

5. The network of claim 1, wherein the relay nodes are pre-configured to drop, add and pass the bent pipe channels depending on channel wavelength, whereby sources and destinations of the bent pipe channels in the network are static.

6. The network of claim 1, wherein each relay node communicates with a plurality of users that are wavelength-separated.

7. The network of claim 1, wherein the bent pipe channels in the optical path is a constant number.

8. The network of claim 1, wherein the relay nodes include optical add-drop multiplexers to add and drop the bent pipe channels into and out of the optical path.

9. The network of claim 1, wherein the optical path is bidirectional, and wherein some of the bent pipe channels carry data in a first direction, and others of the bent pipe channels carry data in a second, opposite direction.

10. The network of claim 5, wherein at least some of the bent pipe channels travel at least two hops before being dropped.

11. The network of claim 6, wherein each relay node is configured to receive an uplink at a specific wavelength and add a bent pipe channel at that specific wavelength.

12. The network of claim 6, wherein at least some of the relay nodes are configured to send data to the users via backup wavelength-dependent bent pipe channels.

13. The network of claim 9, wherein the relay nodes include satellites, and wherein each satellite includes a first optical add-drop multiplexer (OADM) for sending data along the optical path in the first direction, and a second OADM for sending data along the optical path in the second direction.

14. The network of claim 13, wherein the first and second optical apertures are both in optical communication with the first and second OADMs for establishing optical links with near neighbors; and third and fourth optical apertures are both in optical communication with the first and second OADMs for establishing ground station communications.

15. A node for a free space optical communications relay network, the node comprising:
    first and second optical apertures, each in serial communication a neighboring node within an optical path;
    third and fourth optical apertures, each in serial communication with at least one pair of ground stations outside of the optical path; and
    optical circuitry for maintaining the optical path between the first and second apertures, the optical circuitry including a first optical add-drop multiplexer (OADM) for crosslinking data between nearest neighboring relay nodes and for crosslinking data between next nearest neighbors via the third optical apertures and a second OADM for crosslinking data between nearest neighboring relay nodes and for crosslinking data between next nearest neighbors via the fourth optical aperture.

16. The node of claim 15, wherein the optical path is bidirectional.

17. The node of claim 15, wherein the first OADM sends data along the optical path in a first direction the second OADM sends data along the optical path in a second, opposite, direction.

18. The node of claim 15, wherein the node is a satellite.

19. The node of claim 17, wherein the third optical aperture is for uplinking signals to the first OADM and downlinking signals dropped by the first OADM; and the fourth optical aperture is for uplinking signals to the second OADM and downlinking signals dropped by the second OADM.

20. A method for a relay node in a free space optical communications relay network, the method comprising:
    forming an optical path between a first and second optical link in serial communication with near neighbors, the optical path including a plurality of wavelength-dependent optical bent pipe channels that are wavelength-multiplexed;
    downlinking bent pipe channels of a first subset dropped from the first optical link to a third optical link and adding uplinked bent pipe channels of the first subset from the third optical link to the second optical link, wherein at least one pair of dropped and added bent pipe channels of the first subset has the same specific wavelength;
    downlinking bent pipe channels of a second subset dropped from the second optical aperture to a fourth optical aperture and adding uplinked bent pipe channels of the second subset from the fourth optical aperture to the first optical aperture, wherein at least one pair of dropped and added bent pipe channels of the first subset has the same specific wavelength; and
    crosslinking bent pipe channels of a third subset directly between the first and second apertures, wherein the first, second, and third subsets have different wavelengths.

* * * * *